United States Patent [19]

Hutter et al.

[11] 4,028,811
[45] June 14, 1977

[54] TUBULAR GAGE FOR A LIQUID-METAL-COOLED FAST BREEDER REACTOR

[75] Inventors: Ernest Hutter, Wilmette; Leroy A. Tuma, Naperville, both of Ill.

[73] Assignee: The United States of America as represented by the United States Energy Research and Development Administration, Washington, D.C.

[22] Filed: Mar. 2, 1976

[21] Appl. No.: 663,179

[52] U.S. Cl. .............................. 33/174 L; 33/178 F; 176/19 R
[51] Int. Cl.² ................... G01B 3/00; G21C 17/00; G01B 5/12
[58] Field of Search .......... 33/147 F, 147 K, 174 L, 33/175, 178 R, 178 F; 176/19 R, 19 J

[56] References Cited

UNITED STATES PATENTS

| | | | |
|---|---|---|---|
| 2,679,107 | 5/1954 | Gondek | 33/178 R |
| 3,039,198 | 6/1962 | Motley | 33/174 L |
| 3,250,013 | 5/1966 | Bell | 33/178 R |

*Primary Examiner*—Richard E. Aegerter
*Assistant Examiner*—Richard R. Stearns
*Attorney, Agent, or Firm*—Dean F. Carlson; Frank H. Jackson; Joseph N. Hosteny

[57] ABSTRACT

Spring-loaded plungers are arranged about a housing for insertion into a polygonal tube, one plunger for each side of the tube. Each plunger has a locking cam and sliding wedge mechanism which can overcome the spring force associated with the plunger and lock it in any position. The wedges are operated by a rod moveable axially in the housing. Several housings with their associated plungers can be stacked. The stack is lowered into the polygonal tube with all of the plungers locked in a fully inward position. When the stack is in the tube, each wedge is moved to release its locking cam, allowing each of the plungers to spring outward against an inner side of the tube. Each housing will thus gage the internal dimensions of the tube at its elevation. The plungers are locked in position, the entire stack is rotated to bring the plungers into the corners described by the intersections of the flat sides, and the stack is removed from the tube whereupon the dimensions across opposite locked plungers may be read by a micrometer.

10 Claims, 5 Drawing Figures

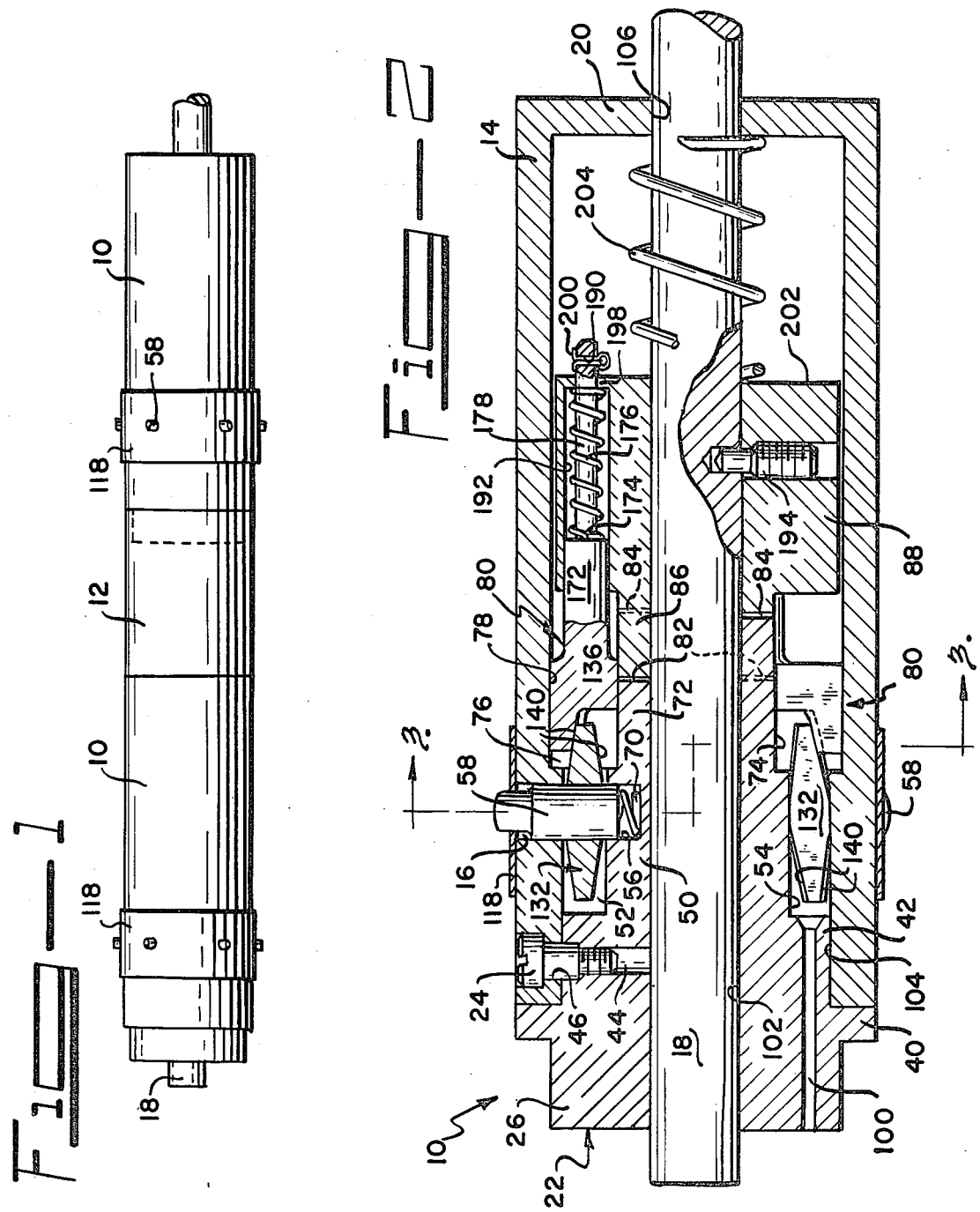

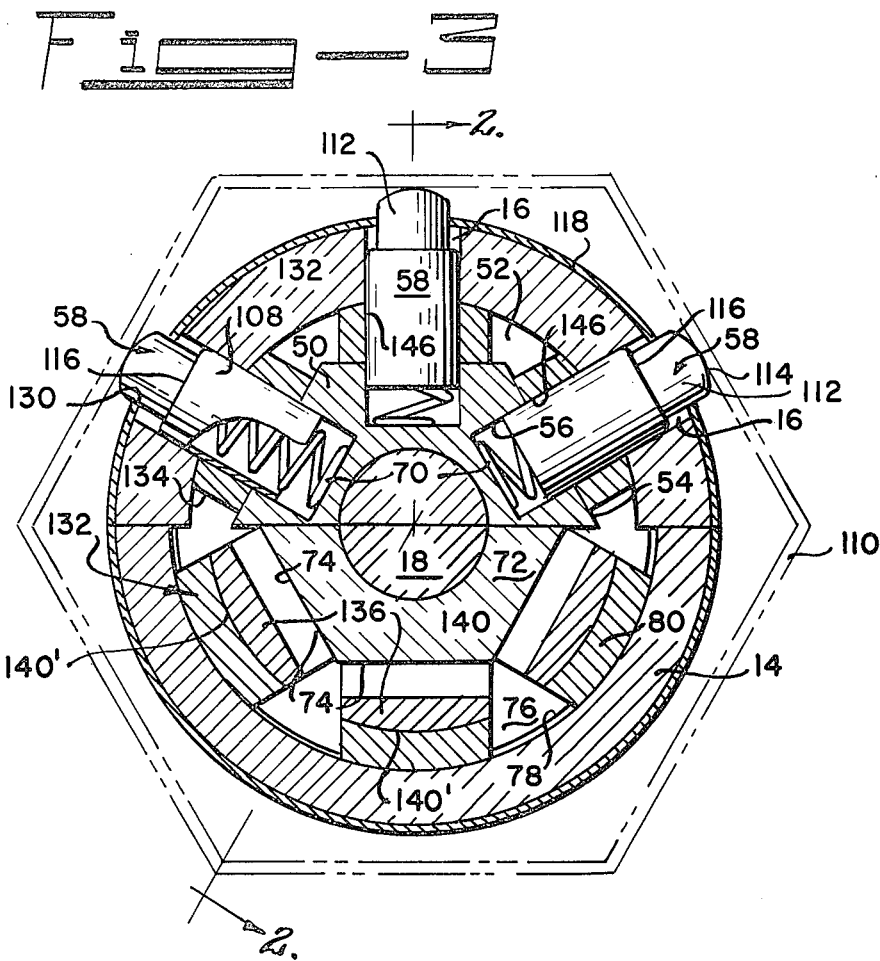

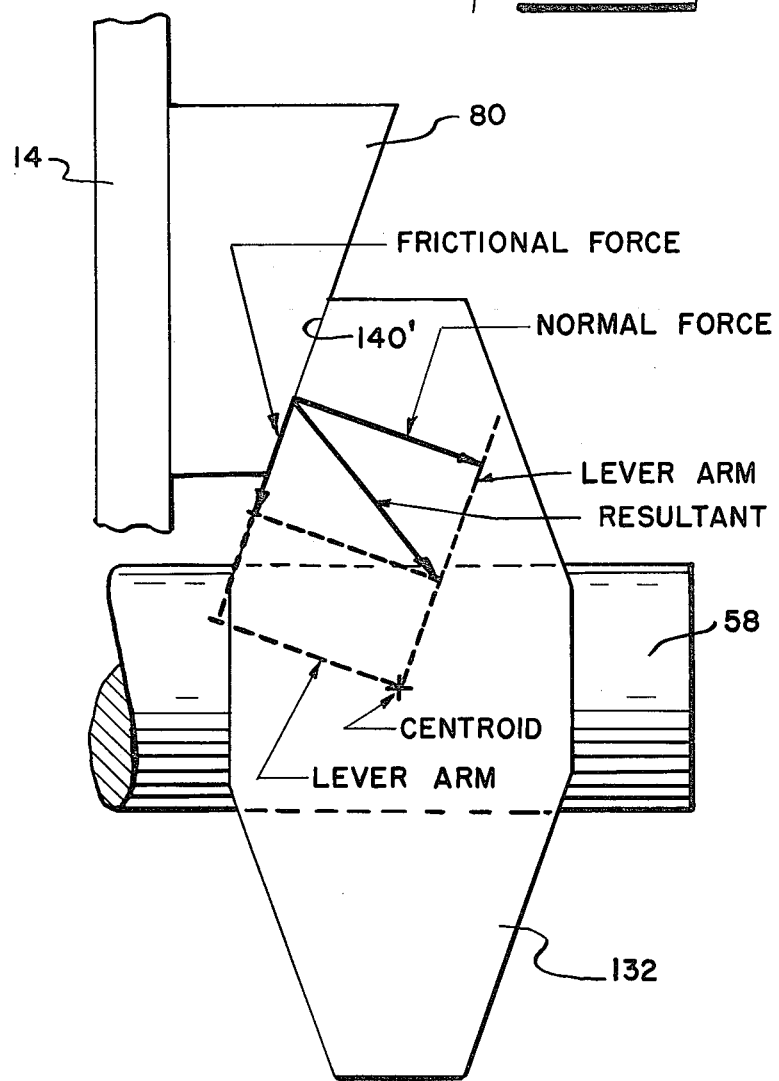

TUBULAR GAGE FOR A LIQUID-METAL-COOLED FAST BREEDER REACTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The invention relates to a tool which may be used to gage the internal dimensions of polygonal tubes. More specifically, the invention relates to a mechanical gage assembly which may be used to determine the swelling due to neutron damage of tubes containing control rods in liquid-metal-cooled fast breeder nuclear reactors.

Nuclear reactors are usually controlled by rods containing material which affect the number of fissions taking place in the core. The rate with respect to time at which these fissions occur is directly proportional to the power produced as heat by the reactor. The rod material may absorb neutrons, thus decreasing the number of neutrons available to cause fissions; or the rod may contain nuclear fuel, thus providing more nuclei to be fissioned. In the former case, the rods must be moved into the core to decrease power, and in the latter, moved out of the core. Combinations of absorber and fuel in the same rod are also possible. In liquid-metal fast breeder reactors, these rods usually are contained within thimbles, which are polygonal tubes extending through the core; the tubes' purpose is to provide support and guidance for the control rods.

The intensity of the neutron radiation in the reactor core is measured by the neutron flux which is the total distance travelled in unit time by all the neutrons present in unit volume; the total distance is often referred to as the track length. In the course of travelling this track length, many neutrons pass through core structures, including the hexagonal thimbles which surround the control rods, prior to causing fissions or leaking out of the core; when passing through such core structures, collisions occur with the atoms of the structure. The main consequence of concern here is distortion of the crystal lattice of the metal structure, resulting in a noticeable increase in the volume of the structure after a period of time. In the case of a control rod thimble, this volumetric increase manifests itself in part as a decrease in the internal diameter of the thimble. Because the clearances between the rod itself and the surrounding thimble are small and precise, swelling due to neutron damage can bind control rods, preventing control rod movement. Controllability of the nuclear reactor may be seriously affected.

In the case of stainless steel materials, for instance, a 5% linear expansion resulting from a volumetric expansion of 15 to 50 vol. % can occur after the material has been exposed to a time-integrated neutron flux of approximately $10^{22}$ nvt. For hexagonal thimbles typically used to house control rods in liquid-metal fast breeder reactor cores, the dimensional change in the internal diameter of the thimble may be in the range of $\pm 76$ $\mu$m ($\pm 30$ mils).

One method of measuring the thimble, which may be as much as 1.5 m (5 feet) long and 5.6 cm (2.2 inches) in diameter, is to use an inside caliper device, reading the calipers by means of a micrometer screw. However, such a device would require removal of the thimble from the reactor core since the caliper reading must be obtained while the device is in place on the tube. It is undesirable to remove the thimble from the core, since the core and thimble are submerged in a pool of radioactive liquid sodium at a temperature of approximately 500° C. Also, handling the thimble outside the reactor would require shielded rooms and remote handling and measuring tools to avoid radioactive contamination from the thimble. Furthermore, shutdown time must be minimized as much as possible due to the economic consequences of the unavailability of a large commercial power-generating breeder reactor. The measurements could not be made by a device inside the core for the additional reason that liquid sodium is opaque and hence are indicating scale on the device could not be read.

Another possible means of determining the inside diameter of the hexagonal thimble would be to use a small-hole gage as described on pages 17 and 18 of *Measurement Techniques in Mechanical Engineering*, by R. J. Sweeney, (John Wiley and Sons, New York, 1953). The small-hole gage employs a single spring-loaded pin which slides in a larger body which supports the pin and spring. A handle is attached to the larger body. A central rod has threaded engagement with a hollow in the handle which communicates with hollow in which the pin slides. The rod terminates in a knob at the top of the handle. By turning the knob, the rod may be brought into contact with the pin, which is then bound in position by the clamping effect. The gage is lowered into a hole with the pin aligned with the diameter or dimension of the hole to be measured. The rod is turned to release the pin, which springs out against the side of the hole. The pin is again clamped, and the gage is removed from the hole and the dimension determined by measuring from the face of the pin to the contact point on the body, opposite the pin face.

Another embodiment of the small-hole gage uses a split sphere, both halves of which are attached to the handle; the rod pulls a wedge into or pushes the wedge out of the space between the two halves, thus increasing or decreasing the sphere diameter. The spherical embodiment would give erroneous readings for distorted polygonal tubes since contact would not be made with all faces and would be difficult to withdraw once contact had been made with some of the inner walls of the thimble due to the thimble's long length and irregular distortion. The continuous sliding during withdrawal might wear the gage and destroy the accuracy of the readings. Additional error might result because the force pushing the halves against the tube is not necessarily constant, but depends upon the human operator. The pin embodiment might be used but would be more time consuming and subject to error. For a hexagonal thimble, three measurements and withdrawal and reinsertion after each measurement would be necessary in order to determine internal diameters of all the faces of the thimble at a single elevation. The present invention measures all faces simultaneously at several elevations. Furthermore, the combined action of the main and compensation springs built into the wedge structure of the present invention insures uniform operation of all plungers. It appears that dimensional tolerances would make it difficult to construct a multiple arrangement of the small-hole gage described by Sweeney.

SUMMARY OF THE INVENTION

The invention is directed to a tool for determining the internal dimensions of polygonal tubes. It is composed of housings suitable for axial stacking within the tube where the outside diameter of each housing is less than the minimum expected inside diameter of the tube; an axially slidable rod extends along the axis of a housing. Each housing has within it a number of plungers equal to the number of sides of the polygonal tube being measured, with the plungers being urged radially from the axis of their housing by springs; a locking cam surrounds each of the plungers to overcome by friction the spring force urging the plunger outward and thus lock it in the position which it is in when the locking cam is actuated by a wedge linked to the axial rod through a pin, a compensating spring, and a wedge support. A main spring is used to urge the wedge support and therefore the wedges toward the locking cams. The wedge, which slides between the cam and the housing, will tilt the locking cam, thus locking the plunger; conversely, reverse movement will unlock the plunger. A cam mount is attached to the bottom of each housing and provides a support for the rod, the plungers and their springs, and the inner surfaces of the locking cams and wedges.

BRIEF DESCRIPTION OF THE DRAWINGS

FIG. 1 is a view of a tool for determining the internal dimensions of polygonal tubes incorporating several tubular gages with spacers separating the gages.

FIG. 2 is a transverse section of a single gage along line 2—2 of FIG. 3.

FIG. 3 is a lateral section through a single gage along line 3—3 in FIG. 2, showing the gage in place within a polygonal tube.

FIG. 4 is an exploded perspective view of a wedge and locking cam.

FIG. 5 is a vector diagram of the forces exerted on a locking cam by a wedge, shown superimposed on a simplified structure.

SPECFIC EMBODIMENT OF THE INVENTION

FIG. 1 displays a portion of a stack containing two gages 10 separated by a spacer 12. It is to be understood throughout the following description that reference to a gage 10 interchangeably signifies either a single gage 10 or a stack of two or more such gages separated by an appropriate number of spacers 12.

Referring to FIG. 2, each gage 10 is composed of a housing 14 having a number of plunger holes 16 spaced about the housing. In the embodiment described, six plunger holes 16 are provided in the housing 14 since the gage 10 is designed for use within a hexagonal thimble. An axial rod 18 is positioned through each housing 14 and supported at the top by a shoulder 20 on the housing and at the bottom by a cam mount 22 anchored to the housing by screws 24.

Stainless steel, Type 304, is the principal material throughout the gage 10 because of its good compatiblity with a radioactive, high-temperature sodium environment.

The cam mount 22 is an elongated piece which mates with the housing 14. The end of the cam mount 22 outside the housing 14 is a cylindrical male portion 26 of a diameter less than the outside diameter of the housing 14. The purpose of this male portion 26 is to mate with a female socket (not shown) in the bottom of a hexagonal control rod thimble. The male portion 26 on the cam mount 22 properly centers the housing 14 in the thimble. Next to the male portion 26 is a flange portion 40 of a diameter equal to the outside diameter of the housing 14 which abuts the base of the housing to increase the rigidity of the combined structure. The next portion of the cam mount 22 is a support portion 42 which closely fits an inside diameter of the housing 14. The support portion 42 has four radial holes 44 drilled in it at 90° intervals; these holes match will holes 46 in the housing. The screws 24 in the holes 44 and 46 fix the cam mount 22 to the housing 14. The close fit between the housing 14 and the support portion 42 of the cam mount 22 increases the rigidity of the combined structure still further. Referring also to FIG. 3, the next portion of the cam mount 22 is a first hexagonal portion 50 smaller than the inside diameter of the housing 14 and hexagonal in cross section; the number of sides of this portion 50 depends, of course, upon the number of plungers to be installed in each housing. An annulus, the locking cam cavity 52, is formed between the housing 14 and the first hexagonal portion 50 of the cam mount 22. Each face 54 on the first hexagonal portion 50 of the cam mount 22 has a blind hole 56 in it of a diameter slightly larger than the outside diameter of a plunger 58 in order to provide both a smooth running fit with and as much support as possible to the plunger. The hole 56 also supplies a base against which a helical plunger spring 70 will operate. The next portion of the cam mount 22 is a second hexagonal portion 72 will shorter (in the plane of FIG. 3) sides than the first hexagonal portion 50. Each face 74 of this second portion 72 is parallel to a face 54 on the first hexagonal portion 50. The second hexagonal portion 72 forms an annulus, the wedge cavity 76, with a larger internal diameter portion 78 of the housing 14 and provides one of the two surfaces on which a wedge 80 slides. In the top of the second hexagonal portion 72 two keyways 82, one shown in phantom (because FIG. 2 is taken along line 2—2 of FIG. 3), are located 180° apart. The keyways commence in the top face 84 of the cam mount 22 and extend into the second hexagonal portion 72 for a distance less than the total length of the second hexagonal portion. These keyways 82 mate with the keys 86, one shown in phantom in FIG. 2, on a wedge support 88 and prevent rotation of the wedge support with respect to the cam mount 22. Several longitudinal drain holes 100 in the cam mount 22 permit communication between the locking cam and wedge cavities 52 and 76 and the external atmosphere so that liquid sodium trapped in the cavities will drain to the sodium pool as the gage 10 is withdrawn above the level of the pool. A rod hole 102 concentric with the longitudinal axis of the cam mount 22 allows passage of the axial rod 18 through the cam mount, and provides support to the rod.

As previously mentioned, the housing 14 has two different internal diameters. One end of the housing 14 has a smaller internal diameter portion 104 which is juxtaposed to the larger internal diameter portion 78. The end of the housing 14 opposite the cam mount 22 is closed except for a hole 106 which functions as a bearing for the rod 18. The radial plunger holes 16 in the housing 14 are concentric with, and the same diameter as, each of the blind holes 56 in the first hexagonal portion 50 of the cam mount 14.

Referring particularly to FIG. 3, each plunger 58 is a cylinder consisting of two portions with different diameters. The larger diameter portion 108 is of a diameter such that a smooth running fit and support may be obtained with the blind holes 56 in the cam mount 22 and plunger holes 16 in the housing 14. This larger portion 108 of the plunger 58 is hollow and the helical plunger spring 70 is trapped in compression between the base of the hollow portion of the plunger and the base of the blind hole 56 in the first hexagonal portion 50 of the cam mount 22. The springs 70 urge the plungers 58 out against the sides of a hexagonal thimble 110 to be gaged. The springs 70 are made of a nickel-chrominum-iron alloy since their spring constants remain nearly constant when exposed to liquid sodium. The smaller diameter portion 112 of the plunger 58 is solid and has a convex face 114, which touches the inner side of the hexagonal thimble 110 to be gaged and which has a radius of curvature equal that of a circle inscribed within the hexagonal control rod thimble 110 in a plane perpendicular to the axis of the thimble. When the gage 10 is rotated to align the plungers 58 with the corners between adjacent inner sides of the thimble, the convex face 114 will minimize the scraping contact between the side and the plunger 58, to preserve the plunger position and hence the measurement. A shoulder 116 between portions 108 and 112 of the plunger 58 limits the outward travel of the plunger of engagement with a retaining ring 118. This ring 118 surrounds the housing 14 and has holes 130 through which the smaller diameter portion 112 of the plunger extends.

Returning to FIG. 2, surrounding each plunger 58 and supported by the cam mount 22 and the housing 14 is a locking cam 132 made of aluminum-bronze, selected for its good sliding character and resistance to galling.

Shifting to FIG. 4, it may be seen that each locking cam 132 is a solid body with a first pair of parallel side surfaces 134 and a second pair of parallel end surfaces 136. The remaining six surfaces of the cam 132 constitute the inner and outer faces 138 and 144. The first pair of parallel side surfaces 134 form the elongated sides of the cam 132; both of these side surfaces are identical rhombuses with each of their corners blunted near the juncture of adjacent edges. The second pair of parallel end surfaces 136 form the ends of the cam 132; each of these end surfaces has two short parallel edges. Each edge is the same length as, and abuts, one of the four blunted corners of side surfaces 134 which are formed by two adjacent edges with a lesser included angle.

The inner face 138 of the cam 132 is formed by a three-rectangular-surface portion. The first and second rectangular surfaces 140 are identical and each connects two long edges of the rhombal side surfaces 134 and a long straight edge of end surfaces 136. The third rectangular surface 142 connects two blunted corners of the side surfaces 134 formed between adjacent edges with the greater included angle and the remaining edges of the two identical rectangular surfaces 140. The inner face 138 faces toward the cam mount 22 and is supported by the first hexagonal portion 50 of the cam mount. The outer face 144 of the cam 132 is different from the inner face 138 in that its three rectangular portions do not lie in a flat plane but are curved at a right angle to the longest axis of the cam 132 to the radius of the smaller internal diameter portion 104 of the housing 14. Rectangular surfaces 140' are sections of oblique circular cylinders, the axes of which lie in the same plane and intersect each other forming an obtuse angle therebetween and intersect the axis of axial rod 18 at acute angles. Rectangular surface 142' is a section of a right circular cylinder, the axis of which is coaxial with the axial rod 18. Therefore, the remaining edges of end surfaces 136 are curved to the same radius. The curvature of the outer face 144 enables the cam 132 to seat firmly against the housing 14 and the wedge 80. The curvature of the rectangular surfaces 140' and 142' is also readily apparent in FIG. 3.

The third rectangular surfaces 142 and 142' of inner and outer faces 138 and 144 of the cam 132 enable accurate measurement of the thickness of the cam; this thickness is important to uniform cam function. Were the two identical rectangular surfaces 140 and 140' on the inner and outer faces 138 and 144 to abut each other, a sharp ridge would be formed which would make measurement difficult.

A hole 146 large enough to provide a smooth running fit with, and as much support as possible to the plunger 58, passes through the centroid of each cam 132; the hole is coaxial with the line passing through the centroid of the cam and parallel to both side and end surfaces 134 and 136.

FIG. 3 demonstrates that the locking cam cavity 52 is formed by the faces 54 of the first hexagonal portion 50 of the cam mount 22 and the smaller internal diameter portion 104 of the housing 14. Because the housing 14 is curved, and each face 54 is flat, the distance between the housing 14 and a face 54 is a maximum in the center of the face and a minimum at the intersection of adjacent faces; the distance varies as would the distance between an arc of a circle and a chord of that arc. This variation, acting in conjunction with surfaces 142 and 142' of cam 132, prevents the cam from moving toward one edge or the other of face 54.

As is shown in an exaggerated way in the lower half of FIG. 2, very slight tilting of the cam 132 will increase the force due to friction retarding the movement of the plunger 58 and, if sufficient, this frictional force will overcome the plunger spring 70 force and lock the plunger 58 in the position it is in when the locking cam 132 is tilted.

Returning again to FIG. 4, a wedge 80 is provided for each locking cam 132; its purpose is to accomplish the cam tilting function in response to a movement of the axial rod 18 with respect to the housing 14. The wedges 80 are disposed about the rod 18 inside the housing 14 in the wedge cavity 76. Each wedge 80 has a base 148. An outer base surface 160, that is, the surface in contact with the housing 14, is curved at a right angle to the direction of travel to the radius of the larger internal diameter portion 78 of the housing. The outer surface 160 is a section of a right circular cylinder the axis of which is coaxial with the axial rod 18. The inner base surface 162, that is, the surface in contact with face 74 of the second hexagonal portion 72 of the cam mount 22, is flat. The wedge cavity 76, shown in FIGS. 2 and 3, exerts a restraining effect upon the base 148 similar to that exerted by the locking cam cavity 52 on the locking cam 132. The outer base surface 160 is extended beyond the base end surface 164. An inclined surface 166 of the wedge 80 extends at an oblique angle from the base end surface 164. The inclined surface 166 is curved at a right angle to the direction of inclination to the radius of the outer face 144 of the locking cam 132 and slides against one rectangular surface 140' of outer face 144. The inclined surface 166 is a section of an oblique circular cylinder the axis of which intersects that of the axial rod 18 at an acute angle. The wedge-end 168 is flat.

Referring to FIG. 5, the wedge 80 exerts a force on locking cam 132 which may be resolved into two components. The first component acts normally to the rectangular surface 140' of the locking cam 132 and the second force is a frictional force acting along the rectangular surface 140' of the locking cam 132. In order to make the locking cam rotate clockwise (in this case) to lock the plunger 58, the normal force component times its lever arm with respect to the centroid of the locking cam 132 must exceed the frictional force component times it lever arm so that, for the cam shown in FIG. 5, the rotation of locking cam 132 will be clockwise because of the net moment acting in that direction. However, as can be seen from FIG. 5, as the wedge 80 moves into the tapered space between the locking cam 132 and the housing 14, the lever arm for the frictional force remains constant while the lever arm for the normal force decreases; assuming the forces remain constant, the tendency of the cam to rotate clockwise is thus reduced. By reducing the frictional force through making the coefficient of friction between the wedge 80 and locking cam 132 as small as possible, the frictional force and therefore its contribution to the net moment rotating the locking cam 132 can be controlled. However, the action of the moment caused by the frictional force may also be utilized to prevent jamming of the locking cam 132 into the plunger 58 because of too great a moment exerted by the normal force. Therefore, in the embodiment described, the motion of the wedge 80 with respect to the locking cam 132 may be utilized to provide a tendency to resist jamming.

Extending from each base 148 is a pin 170 with two portions of different diameters, the larger diameter portion 172 being nearer the base. FIG. 2 shows a compensating spring shoulder 174 formed by a surface perpendicular to the longitudinal axis of the pin between the two diameters of the pin; this shoulder 174 will support one end of a helical nickel-chrome-iron alloy compensating spring 176. At the top of a smaller diameter portion 178 of the pin 170 a locking hole 190 extends through the pin perpendicularly to its longitudinal axis. Each pin 170 slides within a mating hole 192 in the wedge support 88 which is a cylindrical annulus attached by two screws 194 to the axial rod 18; the support's outer diameter is less than the larger internal diameter portion 78 of the housing 14.

The compensating spring 176 is trapped compressively between the base of the mating hole 192 and the compensating spring shoulder 174 on the pin 170. A groove 196, shown in FIG. 4, in the large diameter portion 172 of the pin 170 permits liquid sodium to drain from the cavity occupied by the compensating spring 176. A hole 198 smaller than the mating hole 192 connects the mating hole to the end of the support 88; the small diameter portion 178 of the wedge actuating pin 170 passes through the hole 198 and is retained within the wedge support 88 by cotter pin 200 proceeding through the locking hole 190 at the top of the pin 170. This prevents expulsion of the pin 170 and spring 176 from the wedge support 88 by the compressed compensating spring 176 because the cotter pin 200 is purposely made too large to pass through hole 198 and thus comes to rest against wedge support end face 202.

The purpose of compensating spring 176 is to account for dimensional differences between different locking cams 132 and wedges 80 in the same gage 10. If the wedges 80 were rigidly fixed to the wedge support 88, and if one or more wedges 80 extended below the others, or if the inclined surfaces 166 were if slightly different angles or roughness, or if the locking cams 132 were not all precisely the same shape and located identically, insertion of all the wedges 80 a sufficient distance to lock all the plunger 58 might result in jamming of one or more wedges 80. Conversely, if the wedges 80 were inserted no farther than necessary to avoid jamming, some plunger 58 might not be locked. Jamming of a plunger 58 might result in galling of that plunger, necessitating repair of that gage 10. Failing to lock some plungers 58 would cause loss of the measurements obtained.

The keys 86 extending from the bottom of the wedge support 88 mate with the keyways 82 in the top of the cam mount 22; these keys and keyways rotation of the wedge support 88 with respect to the cam mount, and hence the wedges 80 themselves are always accurately aligned with the locking cams 132. The result is a very rigid and sturdy structure, which is essential to the accuracy and operation of the gage 10. A helical nickel-chromium-iron alloy main spring 204 concentric with the axial rod 18 is trapped compressively between the wedge support 88 and the shoulder 20 on the housing 14 and urges the wedge support 88 toward the bottom of the housing.

In use, the plungers 58 are first locked in a fully retracted position by moving the rod 18 to compress the main spring 204, forcing all the plungers 58 into a fully retracted position against plunger spring 70 force and then lowering the rod 18 with respect to each of the housings 14 so that the wedges 80 tilt the locking cams 132, thus locking the plungers in the retracted position. The lower half of FIG. 2 depicts a retracted plunger 58 and the wedge 80 moved so that the locking cam 132 is in an exaggerated tilted position. The wedges 80, through urged away by the compensating springs 176 from the wedge support 88, will very nearly follow the travel of the wedge support. After the plungers 58 have been locked in the fully retracted position, the stack of gages 10 with spacers 12 as necessary, is lowered through a control rod drive mechanism penetration in the top cover of the primary tank surrounding the liquid-metal-cooled reactor (not shown) into the thimble 110 temporarily vacated by removal of the control rod drive mechanism and associated control rod (not shown). The bottom of the thimble 110 is closed by a structure (not shown) which contains a female socket which mates with and locates the cylindrical male portion 26 of cam mount 22; the socket contains a central depression larger than the axial rod 18, but not as deep as the distance by which the rod extends beyond the bottom of the cam mount. Hence, seating the gage 10 in the female socket will raise the rod 18 against main spring 204 force. When the rod 18 is pushed up, the wedges 80 will retract, allowing the locking cams 132 to release their respective plungers 58, which spring outward against all the internal sides of the hexagonal thimble 110. FIG. 3 best displays this position. Referring to FIGS. 2 and 3, the entire gage 10 is then raised no more than 0.32 cm (0.125 inch); the main spring 204 drives the rod 18 down, allowing the wedges 80 to be reinserted between the locking cams 132 and housings 14, thus locking the plungers 58 in their present position. A 0.32 cm (0.125 inch) movement is used to insure that the locking action takes place. With the specific embodiment described herein, the actual movement necessary to cause locking of the plungers 58 is about 0.25 μm (0.00001 inch). After the plungers 58 are locked, the gage 10 is rotated 30 degrees about its axis to align the plungers 58 with the corners formed by the intersection of adjacent sides of the thimble 110. The convex face 114 of each plunger 58 permits this rotation without binding between the plunger edge and an internal side of the hexagonal thimble 110. Aligning the plungers 58 with the corners allows the gage 10 to be withdrawn without risking involuntary movement of the plungers 58 by binding against a portion of the thimble 110 that is smaller in diameter and above that portion which was measured; such binding would result in the loss of the measurements, difficulty in removing the gage 10, and possible damage to the thimble and gage. The gage 10 is then withdrawn from the thimble 110 and removed to a measuring station where conventional means may be used to determine the dimensions across opposite plunger convex faces 114.

The embodiments of the invention in which an exclusive property or privilege is claimed are defined as follows:

1. A gage for measuring internal dimensions of a polygonal tube comprising:
   a housing;
   means cooperating with a female socket at one end of the polygonal tube to center the housing within the polygonal tube;
   a rod moveable axially within the housing;
   a plunger for each side of the polygonal tube disposed radially about the axial rod and extending through holes in the housing to contact the sides of the polygonal tube;
   plunger springs disposed to urge the plungers outwardly against the sides of the polygonal tube;
   a locking cam including an opening therethrough surrounding each plunger; and
   means responsive to axial movement of the rod for tilting the locking cam to lock the plungers in any position against the action of the plunger springs.

2. The gage as defined in claim 1 wherein the housing is comprised of a cylindrical structure having a shoulder at one end which defines a hole through which the rod passes and is supported thereby, and further including a cam mount attached to the opposite end of the housing having a central hole for passage of the rod therethrough and support of the rod.

3. The gage as defined in claim 2 wherein the cam mount includes a cylindrical male portion outside the housing for mating with a female socket at one end of the polygonal tube whereby the housing is centered in the tube.

4. The gage as defined in claim 1 wherein each plunger is comprised of:
   a larger diameter hollow portion which partially contains the outwardly urging plunger spring;
   a smaller diameter portion terminating in a convex face which touches the side of the polygonal tube.

5. The gage as defined in claim 4 further comprising a retaining ring having a plurality of holes each of a diameter between the two diameters of the plunger and surrounding the housing with the holes concentric with the holes in the housing to limit the outward travel of the plungers by engagement of the retaining ring with the larger diameter portion of the plunger.

6. The gage as defined in claim 1 wherein each locking cam is a solid body comprising:
   a pair of parallel rhombic side surfaces with their corners blunted near the juncture of adjacent edges;
   an inner face; and
   an outer face.

7. The gage as defined in claim 6 wherein the inner face of the locking cam is comprised of two identical rectangular surfaces each connecting two long edges of the rhombic side surfaces and a third rectangular surface connecting two blunted corners of the side surfaces formed between adjacent edges with the greater included angle and two edges of the two identical rectangular surfaces.

8. The gage as defined in claim 7 wherein the outer face of the locking cam is composed of three rectangular surfaces, arranged substantially as those of the inner face except being curved in a direction at right angles to the longest axis of the cam.

9. The gage as defined in claim 1 wherein the means responsive to movement of the rod for tilting the locking cam comprises:
   a wedge support fastened to the rod and having a plurality of holes therein parallel to the rod;
   a main spring surrounding the rod and trapped compressively between the wedge support and shoulder on one end of the housing;
   a plurality of wedges, one for each locking cam, each attached to the wedge support by a pin extending from a base on each wedge into a hole in the wedge support and moveably retained in the wedge support;
   a plurality of springs, one for each wedge, each surrounding a pin and urging a wedge toward a locking cam.

10. A tubular gage for determining the extent of radiation-induced swelling inside hexagonal control rod thimbles in liquid-metal-cooled fast-breeder nuclear reactors, comprising:
   a cylindrical housing having six radial plunger holes spaced equally around a circumference of the housing;
   a cam mount fastened to one end of the housing and having a cylindrical male portion projecting outside the housing, a juxtaposed cylindrical support portion fitting closely inside the housing, a smaller juxtaposed first hexagonal portion wherein each face of the hexagonal portion defines a blind hole concentric with, and the same diameter as, one of the radial holes in the housing, said first hexagonal portion forming an annulus with the housing, and a still smaller second hexagonal portion juxtaposed to the first hexagonal portion wherein the faces of the second portion are each parallel to a face of the first portion, said second hexagonal portion forming a larger annulus with the housing, and two keyways in the top of the second hexagonal portion, and a rod hole penetrating through the entire length of the cam mount concentric with its longitudinal axis, and six smaller holes in the cylindrical portion communicating the small annulus with the outside of the gage;
   an axial rod disposed moveably within the housing, supported at one end by a shoulder on the housing, and at the other end of the rod hole in the cam mount, and terminating a distance beyond the male portion of the cam mount;

a pluger positioned moveably in and supported by each of the blind holes in the cam mount and the concentric plunger holes in the housing, each plunger having a hollow portion nearer the cam mount which contains a helical spring trapped between the base of the blind hole and the base of the hollow portion whereby the plunger is urged outward, and a smaller diameter solid portion terminating in a convex face with a radius of curvature equal to that of a circle inscribed within the hexagonal control rod thimble in a plane perpendicular to the axis of the thimble;

a locking cam, surrounding each plunger, with a pair of parallel rhombic side surfaces with their corners blunted near the juncture of adjacent edges, and inner and outer faces each having three rectangular surfaces, two of the rectangular surfaces being identical and each connecting two long edges of the rhombic side surfaces and the third rectangular surfaces each connecting two blunted corners of the side surfaces formed between edges thereof with the greater included angle and one edge of two identical rectangular surfaces on the same face, wherein the first and second rectangular surfaces of the outer face are sections of oblique circular the axes of which lie in the same plane and intersect each other forming an obtuse angle therebetween and intersect the axis of the axial rod at acute angles, and the third rectangular surface of the outer face is a section of a right circular cylinder the axis of which is coaxial with the axial rod and the rectangular surfaces of the inner face are flat, said cam having a hole passing through its centroid concentric with an axis parallel to the side surfaces and perpendicular to the third rectangular surfaces, the hole being a diameter which provides a running fit with the plunger whereby tilting the cam will increase the frictional retarding force along the axis of plunger movement, overcoming the plunger force thereby preventing further plunger movement, said cam being retained in a locking cavity by the plunger and supported by the first hexagonal portion of the cam mount on the third rectangular surface of the inner face, and by the smaller internal diameter portion of the housing on the third rectangular surface of the outer face;

a wedge support, fixed to and surrounding the axial rod, and having six holes each with a larger diameter portion terminating in the surface of the wedge support nearer the plungers, and a smaller diameter portion terminating in the end face of the wedge support, the holes being parallel to the axial rod;

a helical main spring concentric with the axial rod and trapped between the wedge support and the shoulder on the housing, whereby the wedge support and axial rod are urged toward the plungers;

a wedge positioned adjustably between the housing and one of the identical rectangular surfaces of the outer face of each locking cam with a thinner end of the wedge nearer the plunger, an outer surface of the wedge being a section of a right circular cylinder whose axis is coaxial with the axis rod and an inclined surface of the wedge which is a section of an oblique circular cylinder the axis of which intersects the axis of the axial rod at an acute angle and which slides on a rectangular surface on the outer face of the locking cam and having a pin projecting from the base of the wedge into a hole of the wedge support, the pin having two diameters, the end away from the wedge being of a smaller diameter whereby a helical compensating spring, concentric with the pin, is trapped between a larger diameter portion of the pin, and the base of the larger diameter portion of the hole in the wedge support, thus urging the wedge away from the wedge support, the smaller portion of the pin continuing through the hole and extending beyond the end of the wedge support, where the pin is retained moveably within the wedge support by a fastener; and a retaining ring surrounding the housing and having retaining holes concentric with the radical plunger holes in the housing, the retaining holes having a diameter between the two diameters of the plungers whereby outward motion of the plungers will be stopped by the larger diameter portion of the plunger engaging the retaining ring.

* * * * *